United States Patent
Munz et al.

(10) Patent No.: US 10,935,955 B2
(45) Date of Patent: Mar. 2, 2021

(54) METHOD AND SYSTEM FOR OPERATING A MULTI-AXIS MACHINE, IN PARTICULAR A ROBOT

(71) Applicant: KUKA Deutschland GmbH, Augsburg (DE)

(72) Inventors: Heinrich Munz, Bergatreute (DE); Josef Leibinger, Weingarten (DE)

(73) Assignee: KUKA Deutschland GmbH, Augsburg (DE)

( * ) Notice: Subject to any disclaimer, the term of this patent is extended or adjusted under 35 U.S.C. 154(b) by 1038 days.

(21) Appl. No.: 15/040,313

(22) Filed: Feb. 10, 2016

(65) Prior Publication Data

US 2016/0231728 A1 Aug. 11, 2016

(30) Foreign Application Priority Data

Feb. 11, 2015 (DE) .......................... 102015001741.1

(51) Int. Cl.
- *G06F 7/66* (2006.01)
- *G05B 19/402* (2006.01)
- *B25J 9/16* (2006.01)

(52) U.S. Cl.
CPC .......... *G05B 19/402* (2013.01); *B25J 9/1674* (2013.01); *G05B 2219/34235* (2013.01); *G05B 2219/34484* (2013.01); *G05B 2219/42306* (2013.01)

(58) Field of Classification Search
CPC ...... B25J 9/1679; B25J 9/1674; B25J 9/1697; G05B 19/402

(Continued)

(56) References Cited

U.S. PATENT DOCUMENTS

| | | | |
|---|---|---|---|
| 2007/0140821 A1* | 6/2007 | Garon .................... | B25J 9/0084 414/618 |
| 2010/0222924 A1* | 9/2010 | Gienger ................. | G05B 19/42 700/246 |

(Continued)

FOREIGN PATENT DOCUMENTS

| | | |
|---|---|---|
| CN | 102666033 A | 9/2012 |
| DE | 102007050232 A1 | 4/2009 |

(Continued)

OTHER PUBLICATIONS

Chinese Patent Office; Examination Report in Chinese Patent Application No. 201610081318.6 dated Aug. 28, 2017; 5 pages.

(Continued)

*Primary Examiner* — Brook Kebede
(74) *Attorney, Agent, or Firm* — Dorton & Willis, LLP

(57) ABSTRACT

A method for operating a multiple axis machine includes controlling drives of the machine with a machine control system and monitoring the machine with a fail-safe control system having first and second redundant channels. Each of the first and second channels receives first input target values and first input actual values from the machine control system, and compares first reference target values (based on the first input target values) with first reference actual values (based on the first input actual values). A fault reaction is triggered if there is a deviation between the compared values that exceeds a specified tolerance. The first input values comprise reference position values of a machine-fixed reference or time derivatives thereof, and the machine control system determines target and/or actual reference position values based on a transformation between reference position values of the machine-fixed reference and axial position values of the machine.

18 Claims, 1 Drawing Sheet

Figure 1:
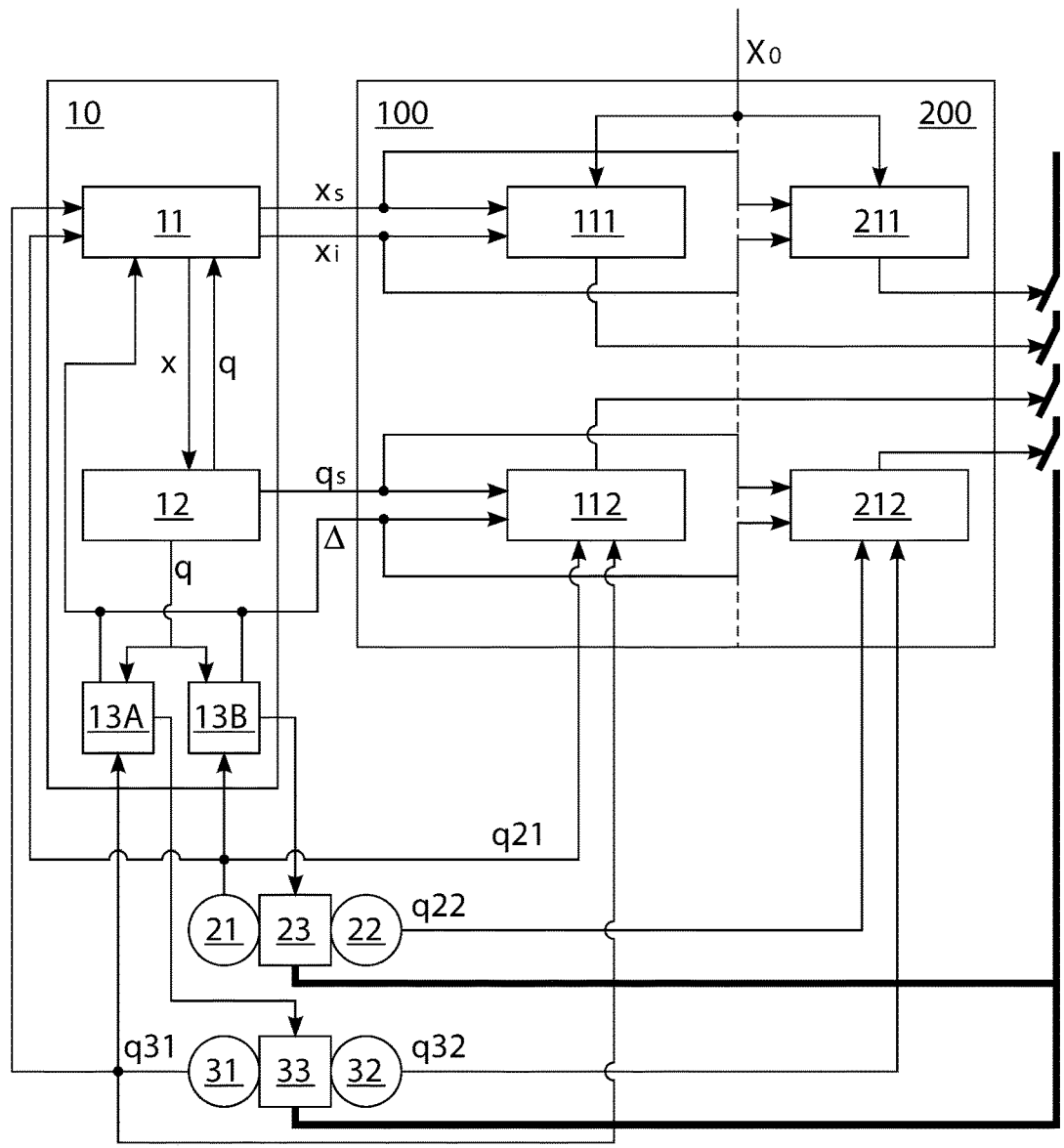

(58) Field of Classification Search
USPC .......................................... 700/193, 246, 259
See application file for complete search history.

(56) References Cited

U.S. PATENT DOCUMENTS

2010/0234996 A1    9/2010  Schreiber et al.
2013/0030570 A1*   1/2013  Shimizu ................ B25J 9/1679
                                                    700/259

FOREIGN PATENT DOCUMENTS

| DE | 102010004474 A1 | 7/2011 |
| DE | 102010010717 A1 | 9/2011 |
| DE | 102011003539 A1 | 8/2012 |
| EP | 0742499 A2 | 11/1996 |
| EP | 0742505 A2 | 11/1996 |
| EP | 2671691 A2 | 12/2013 |
| JP | 2008188694 A | 8/2008 |

OTHER PUBLICATIONS

German Patent Office; Examination Report in German Patent Application No. 10 2015 001 741.1 dated Aug. 5, 2015; 10 pages.
European Patent Office; Search Report in European Patent Application No. 15003371.0 dated Jun. 17, 2016; 9 pages.
Daniela Steidl et al.; Publication entitled "Inverse Kinematik" dated Jun. 30, 2011; 43 pages.
Wikipedia; "Direkte Kinematik" dated Jun. 9, 2016; 2 pages.
Wikipedia; "Inverse Kinematik" dated Jun. 8, 2016; 3 pages.
Korean Patent Office; Office Action in Korean Patent Application No. 10-2016-0007490 dated Aug. 29, 2017; 16 pages.

* cited by examiner

METHOD AND SYSTEM FOR OPERATING A MULTI-AXIS MACHINE, IN PARTICULAR A ROBOT

CROSS-REFERENCE TO RELATED APPLICATIONS

This application claims the benefit of priority under 35 U.S.C. § 119(a) to German Patent Application DE 10 2015 001 741.1, filed Feb. 11, 2015 (pending), the disclosure of which is hereby incorporated by reference in its entirety.

TECHNICAL FIELD

The present invention relates to a method and a system for operating a multiple axis machine, in particular a robot; an arrangement comprising a robot and the system; as well as a computer program product for carrying out the method.

BACKGROUND

It is known from in-house practice to compare in a fail-safe control system the actual reference position values of a machine-fixed reference, such as a TCP (tool center point), with the preset threshold values, in order to monitor, for example, a working space of a robot. In this case the fail-safe control system determines these actual reference position values on the basis of a so-called forward transformation from the acquired actual axial position values.

The drawback with this method is that it increases the computational complexity in the fail-safe control system. In addition, there has to be a model, on which the forward transformation is based and which is adapted when the kinematics of the machine change.

On the other hand, a machine control system, which controls the drives of the multiple axis machine, often executes a computation intensive reverse transformation in any event, in order to determine the associated target axial position values from the preset target reference position values. In this case this reverse transformation can be based on the same model.

The object of the present invention is to improve the operation of a multiple axis machine.

SUMMARY

According to one aspect of the present invention, a system for operating a multiple axis machine, in particular, a multiple axis robot, in particular, a system of an arrangement for operating a robot of the arrangement, comprises a machine control system for controlling the drives of the machine and a fail-safe control system for monitoring the machine with a first channel and a redundant, in particular, dissimilar second channel. In this context the term "multiple axis machine" means that the machine has at least two axes, each of which can be allocated a drive. However, it goes without saying that the machine can also have three, four, five, six or more axes or more specifically drives. In particular, the multiple axis machine may be a robot, in particular, an industrial robot, which has exactly five, six or seven axes or rather drives. In this context the term "dissimilar" describes, in particular, the situation that the second dissimilar channel uses an implementing technology that is different from that of the first channel; and in particular, that the second channel is implemented in hardware and/or software. Thus, for example, each channel may be provided with different electronic complements, different types of components, and/or different circuit designs. As an alternative or in addition, different programs and/or programming language translators (compilers), both, in particular, from different manufacturers, can be used.

In the present invention the term "controlling" is defined, in particular, as the input of the target values into the drive regulators of the drives of the machine. Similarly the term "regulating", i.e. an input of the target values, on the basis of a comparison with the acquired or more specifically determined actual values, may be defined very loosely as controlling in the sense of the present invention. Thus, in the context of the present invention a control action may be a so-called forward control ("feed forward control") or a regulating action ("feedback control"). Correspondingly in one embodiment the system exhibits drive control units, in particular, drive regulators, for controlling, in particular, regulating, the drives of the machine. These drive control units can be a part of the machine control system or can receive the control variables from said machine control system and can control, in particular, energize the drives on the basis of said control variables.

In one embodiment the fail-safe control system has exactly or at least two channels. In one embodiment these channels may be designed so as to be redundant, in particular, dissimilar in hardware and/or software. In particular, they may be implemented on different, in particular, dissimilar, processors or cores of a multi-core processor; and may have different, in particular, dissimilar data links, in particular, busses; and/or may have or more specifically may execute different, in particular, dissimilar programs.

According to one aspect of the present invention, the first channel receives first input target values and first input actual values from the machine control system; compares the first reference target values, which depend on the first input target values, in particular, may be the first input target values, and the first reference actual values, which depend on the first input actual values, in particular may be the first input actual values, with each other; and triggers a fault reaction, in the event that a deviation between the first reference target values and the first reference actual values exceeds a specified tolerance.

The second channel receives in a redundant manner, in particular, in parallel and/or in a dissimilar way, in particular, the same, first input target values and, in particular, the same, first input actual values from the machine control system; compares the first reference target values, which depend on the first input target values, in particular, are determined in the same way as in the first channel, in particular, may be the first input target values, and the first reference actual values, which depend on the first input actual values, in particular, are determined in the same way as in the first channel, in particular, may be the first input actual values, with each other; and triggers a fault reaction, in particular, the same fault reaction, in the event that a deviation between the first reference target values and the first reference actual values exceeds a specified tolerance, in particular, the same tolerance.

In one embodiment the first input target values comprise the (target) reference position values of a machine-fixed reference of the machine and/or first and/or higher time derivatives thereof; and the first input actual values comprise the (actual) reference position values of the machine-fixed reference of the machine and/or first and/or higher time derivatives thereof; and the machine control system determines these target reference position values and/or these actual reference position values on the basis of a transformation between the reference position values of the machine-fixed reference and the axial position values of the machine.

In one embodiment the reference position values comprise, in particular, Cartesian, position and/or orientation coordinates or more specifically angular coordinates and/or give in one embodiment a distance, in particular, a one, two or three dimensional distance and/or an orientation, in particular, a one, two or three dimensional orientation of the machine-fixed reference to a reference point or more specifically reference coordinate system, in particular, a machine-fixed, workpiece-fixed and/or surrounding-fixed reference point or more specifically reference coordinate system. In one embodiment the machine-fixed reference is the TCP ("tool center point") of a robot.

The effect is that, on the one hand, in one embodiment it is possible to move the time intensive computing process of determining the reference position values, based on a transformation, away from the fail-safe control system into the machine control system. Such a measure allows, in particular, the fail-safe control system to be more compact. In addition, it is possible to use for this transformation a model, which is stored in the machine control system, in particular kinematic data, such as the axial distances and the like, of the machine. Then there is the advantage that said model no longer has to be stored in the fail-safe control system, nor does it have to be updated.

On the other hand, there is the advantage that the two channel, redundant checking of the target and actual reference position values can ensure that the machine will run safely.

In one embodiment the machine control system determines the actual reference position values, which comprise, in particular, are the first input actual values, on the basis of a forward transformation between the reference position values of the machine-fixed reference and the acquired actual axial position values of the machine. In addition or as an alternative, the machine control system determines in one embodiment the target reference position values, which comprise, in particular, are the first input target values, on the basis of a forward transformation, in particular, the same or a different forward transformation between the reference position values of the machine-fixed reference and the preset target axial position values of the machine, for example, when a movement of the axes is specified. In another embodiment the machine control system determines the target reference position values, which comprise, in particular, are the first input target values, on the basis of a specified control program of the machine, in particular, by means of path planning and/or interpolation.

In one embodiment the first channel receives additionally second input target values and second input actual values; compares the second reference target values, which depend on the second input target values, in particular, may be the second input target values, and the second reference actual values, which depend on the second input actual values, in particular, may be the second input actual values, with each other; and triggers a fault reaction, in the event that a deviation between these second reference target values and the second reference actual values exceeds a specified tolerance.

The second channel receives in a redundant manner, in particular, in parallel and/or in a dissimilar way, in particular, the same, second input target values and, in particular, the same or different, in particular, redundant, second input actual values; compares the second reference target values, which depend on the second input target values, in particular, are determined in the same way as in the first channel, in particular, may be the second input target values, and the second reference actual values, which depend on these second input actual values, in particular, are determined in the same way as in the first channel, in particular, may be the second input actual values, with each other; and triggers a fault reaction, in the event that a deviation between these second reference target values and the second reference actual values exceeds a specified tolerance, in particular, the same tolerance, in particular, the same fault reaction as in the first channel.

In one embodiment the second input target values comprise the (target) axial position values of the machine and/or first and/or higher time derivatives thereof; and the second input actual values comprise the (actual) axial position values of the machine and/or first and/or higher time derivatives thereof.

In one embodiment the axial position values comprise the joint coordinates or rather the joint positions, in particular, the joint angles, of one or more axes of motion, in particular, all of the axes of motion of the multiple axes machine and/or give in one embodiment a position of one axis relative to a reference position or more specifically home position. In one embodiment the axial position values are the angular positions of the drives, in particular, the motors and/or the gear units, coupled to said motors, in particular, of a robot.

In a further development the machine control system determines the target axial position values, which the first and second channels receive from the machine control system and which comprise, in particular, are the second input target values, on the basis of a reverse transformation between the target reference position values of the machine-fixed reference and the axial position values of the machine.

The effect is that in one embodiment it is possible to move the time intensive computing process of determining the reference position values, based on a transformation, even further away from the fail-safe control system into the machine control system. Such a measure allows, in particular, the fail-safe control system to be more compact. In addition, it is possible to use for this transformation a model, which is stored in the machine control system, in particular, the kinematic data, such as the axial distances and the like, of the machine. Then there is the advantage that said model no longer has to be stored in the fail-safe control system, nor does it have to be updated. On the other hand, there is the advantage that the two channel, redundant checking of the target and actual axial position values can ensure that the machine will run safely. In one embodiment the forward and reverse transformations, which the machine control system executes, are different from each other; in particular, they can be based on different models, in order to increase the safety.

In one embodiment the drive control units determine the so-called lag errors between the preset target axial position values and the acquired actual axial position values and/or the time derivatives thereof and determine, on the basis of these lag errors, the control variables for the drives, for example, on the basis of a cascade and/or P(I)D control unit or the like. In one embodiment the lag error is the difference between a target value and a respective actual value: target value=actual value+lag error.

According to one aspect of the present invention, the fail-safe control system considers such lag errors, which are determined by the drive control units, when comparing the target values and the actual values, because a deviation in the framework of such lag errors is system immanent and, thus, does not show that an error has occurred. This arrangement makes it possible to improve the monitoring in an advantageous way.

As a result, in one embodiment the machine control system determines first and/or second input target values, on the basis of lag errors, determined in the drive control units, in particular, by subtracting these lag errors from the input target values, before the fail-safe control system receives them (the first/second input target value, which the fail-safe control system receives=input target value determined on the basis of a transformation or a control program–lag error). In another embodiment the machine control system determines in an analogous manner the first and/or second input actual values, on the basis of lag errors, determined in the drive control units, in particular, by adding these lag errors to the input actual values, before the fail-safe control system receives them (the first/second input actual value, which the fail-safe control system receives=input actual value determined on the basis of a transformation or received from an acquisition means+lag error).

In another embodiment the first and second channels of the fail-safe control system determine in a redundant way, in particular, in parallel and/or in a dissimilar way the first and/or second reference target values on the basis of lag errors, determined in the drive control units, in particular, by subtracting these lag errors from the received input target values (first/second reference target value=input target value received from the machine control system–lag error). In another embodiment the first and second channels of the fail-safe control system determine in a redundant way, in particular, in parallel and/or in a dissimilar way the first and/or second reference actual values on the basis of lag errors, determined in the drive control units, in particular, by adding these lag errors to the received input actual values (first/second reference actual value=input actual value received from the machine control system or an acquisition means+lag error).

If the first and/or second reference target values or first and/or second reference actual values comprise first or higher time derivatives of the reference position values or more specifically the axial position values, then in one embodiment the machine control system determines the corresponding time derivatives by means of time differentiation, in particular, numerical time differentiation. Then in a further development the first and second channels of the fail-safe control system receive these time derivatives, in addition or as an alternative to the reference position values and/or the axial position values, from the machine control system. This measure has the advantage that more time intensive computational processing can be moved from the fail-safe control system into the machine control system.

In another embodiment the first and second channels of the fail-safe control system determine in a redundant way, in particular, in parallel and/or in a dissimilar way the corresponding time derivatives by means of time differentiation, in particular, numerical time differentiation, of the reference position values or axial position values received from the machine control system. This measure allows the safety to be further increased in an advantageous way.

In one embodiment the first and second channels receive from the machine control system the same first and/or second input target values and/or the same first input actual values. Thus, in one embodiment a consistency check of the same data is carried out in a redundant manner, in particular, a dissimilar way, in the two channels. This measure allows the safety to be further increased in an advantageous way.

In one embodiment the first and second channels receive second input actual values that are determined in a redundant way by an acquisition means. In one embodiment the acquisition means determines, in particular, acquires second input actual values, in particular, actual axial position values, in a redundant way, in particular, in a dissimilar way. In a further development said acquisition means comprises at least two different, in particular, dissimilar, sensors in order to acquire in different ways the same actual value. In addition or as an alternative, the acquisition means can also process the same or different actual values in a redundant way, in particular, in a dissimilar way. This measure allows the safety to be further increased in an advantageous way.

In one embodiment the acquisition means and/or the fail-safe control system compares and/or compare the redundantly determined second input actual values and triggers and/or trigger a fault reaction, in the event that a deviation between these differently determined second input actual values exceeds a specified tolerance.

In one embodiment the first and second channels compare in a redundant way, in particular, in parallel and/or in a dissimilar way the reference target values and/or the reference actual values, with, in particular, variable, preset threshold values and trigger a fault reaction, in particular, the same fault reaction, in the event that a deviation between the reference values and the threshold values exceeds a specified tolerance.

In this way it is possible to implement a monitoring of the space and/or axis, in addition to a consistency check of the target and actual reference position values and/or the target and actual axial position values.

In one embodiment the fail-safe control system carries out, in particular, cyclically a self-test and triggers a fault reaction, in the event that the self-test shows a malfunction. This measure makes it possible to increase the safety even more.

In one embodiment the fail-safe control system comprises reliable inputs for receiving external error signals, for example, an emergency off, enabling buttons, operating mode selector switch or the like, and triggers a fault reaction, in the event that said fail-safe control system receives an external error signal. At the same time an external error signal can also comprise, in particular, be an omission of an external fault-free signal. In a further development a plurality of inputs of the fail-safe control system are linked to each other, in particular, logically linked so that the fail-safe control system triggers a fault reaction, in the event that it receives several external error signals in a specific combination.

A fault reaction can comprise, in particular, the output of a warning signal, in particular, a visual and/or auditory warning signal, a traversing of the machine into a predefined position, a separation of the drives from a power supply and/or a closing of the brakes and the like.

According to one aspect of the present invention, the system for carrying out a method described herein is configured in hardware and/or software.

Therefore, in one embodiment the first channel comprises means for comparing the first reference target values, which depend on the first input target values received from the machine control system, in particular, may be the first input target values, and the first reference actual values, which depend on the first input actual values received from the machine control system, in particular, may be the first input actual values, with each other and comprises means for triggering a fault reaction, in the event that a deviation between the first reference target values and the first reference actual values exceeds a specified tolerance. The second channel comprises means for comparing the first reference target values, which depend, in particular, on the same, first input target values received from the machine control system, in particular, are determined in the same way as in the first channel, in particular, may be the first input target values, and the first reference actual values, which depend, in particular, on the same first input actual values received from the machine control system, in particular, are determined in the same way as in the first channel, in particular, may be the first input actual values, with each other, and comprises means for triggering a fault reaction, in particular, the same fault reaction, in the event that a deviation between the first reference target values and the first reference actual values exceeds a specified tolerance, in particular, the same tolerance.

In one embodiment the machine control system comprises means for determining the target and/or actual reference position values of a machine-fixed reference of the machine on the basis of a transformation between the reference position values of the machine-fixed reference and the axial position values of the machine. In this case the first input target values and the first input actual values comprise these reference position values and/or first and/or higher time derivative thereof.

In one embodiment the first channel comprises means for comparing the second reference target values, which depend on the second input target values received, in particular, from the machine control system, in particular, may be the second input target values, and the second reference actual values, which depend on the second input actual values received, in particular, from an acquisition means, in particular, may be the second input actual values, with each other and comprises means for triggering a fault reaction, in the event that a deviation between the second reference target values and the second reference actual values exceeds a specified tolerance. The second channel comprises means for comparing the second reference target values, which depend, in particular, on the same, second input target values received, in particular, from the machine control system, in particular, are determined in the same way as in the first channel, in particular, may be the second input target values, and the second reference actual values, which are received, in particular, from the acquisition means, and depend on the second input actual values, which are determined by said acquisition means in a redundant manner, in particular, are determined in the same way as in the first channel, in particular, may be the second input target values, with each other, and comprises means for triggering a fault reaction, in particular, the same fault reaction, in the event that a deviation between these second reference target values and the second reference actual values exceeds a specified tolerance, in particular, the same tolerance.

Correspondingly in one embodiment the machine control system comprises means for determining the target axial position values of the machine, said target axial position values being received by the first and second channel from the machine control system, on the basis of a transformation between the reference position values of a machine-fixed reference and the axial position values of the machine. In this case the second input target values and the second input actual values comprise these axial position values and/or first and/or higher time derivative thereof.

In one embodiment the machine control system comprises means for determining the first and/or second input target values and/or input actual values, on the basis of lag errors, determined in the drive control units. In another embodiment the first and second channels comprise means for determining the first and/or second reference target values and/or reference actual values, on the basis of lag errors, determined in the drive control units. Correspondingly in one embodiment the drive control units comprise means for determining a lag error.

In addition or as an alternative, the machine control system in one embodiment comprises means for determining the first and/or second input target values and/or input actual values by means of time differentiation. In addition or as an alternative, the first and second channels in one embodiment comprise means for determining the first and/or second reference target values and/or reference actual values by means of time differentiation.

In one embodiment the system comprises acquisition means for determining in a redundant, in particular, dissimilar way the second input actual values, which the first and second channels receive.

In one embodiment the first and second channels comprise in each case means for comparing first and/or second reference target values and/or first and/or second reference actual values with, in particular, variable, preset threshold values and comprise means for triggering a fault reaction, in the event that a deviation exceeds a specified tolerance.

In one embodiment the fail-safe control system comprises means, in particular, in order to carry out cyclically a self-test and to trigger a fault reaction, in the event that the self-test shows a malfunction.

In one embodiment the fail-safe control system comprises reliable inputs for receiving external error signals and comprises means for triggering a fault reaction, in the event that the said fail-safe control system receives an external error signal.

A means in the context of the present invention may be designed in hardware and/or software. In particular, it may comprise a processor, in particular, a digital processor, which is preferably data connected or more specifically is signal connected to a memory system and/or a bus system. In particular, said means may comprise a microprocessor unit (CPU) and/or one or more programs or program modules. The CPU may be designed to process commands, which are implemented as a program that is stored in a memory system; to acquire input signals from a data bus; and/or to send output signals to a data bus. A memory system may be one or more, in particular, different memory media, in particular, optical, magnetic solid-state media and/or other non-volatile media. The program may be created in such a way that it embodies or more specifically is able to carry out the methods described herein so that the CPU can carry out the steps of such methods and, as a result, can run the machine.

Figure 2:
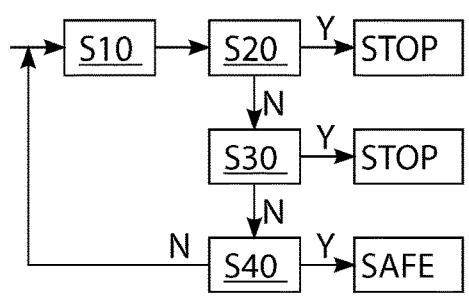

Other advantages and features will become apparent from the dependent claims and the embodiments that are shown merely for illustrative purposes. For this purpose the drawings show to some extent in schematic form in:

FIG. 1: a system of an arrangement according to one embodiment of the present invention; and FIG. 2: a method according to one embodiment of the present invention.

DETAILED DESCRIPTION

FIG. 1 shows an arrangement of a robot, of which FIG. 1 shows only two drives 23, 33 as representative examples thereof, and a system for operating this robot, according to one embodiment of the present invention. FIG. 2 shows a method for operating this robot according to one embodiment of the present invention, where in this case the method is carried out by means of the system that is configured in software and hardware for this purpose.

The system comprises a machine control system 10 with drive control units 13A, 13B, which control the drives 23, 33.

Furthermore, the system comprises a fail-safe control system with a first channel 100 and a redundant, in particular, dissimilar, second channel 200, which monitors the robot.

In a first step S10 (see FIG. 2) a means 11 of the machine control system 10 determines, on the basis of a specified control program, in particular, by means of path planning and/or interpolation, target reference position values x for the TCP of the robot.

From these target reference position values x for the TCP a means 12 of the machine control system 10 determines, on the basis of a reverse transformation between the reference position values of the TCP and the axial position values, the target axial position values q, as indicated by means of the data flow 11–x→12 in FIG. 1.

As an alternative, in step S10 the means 11 can also determine the target reference position values x for the TCP on the basis of a forward transformation between the reference position values of the TCP and the preset target axial position values q, which are specified, for example, by means of manually moving an axis of the robot, as indicated by means of the data flow 12–q→11 in FIG. 1.

The first and second channels 100, 200 receive the target reference position values x for the TCP as the first input target values $x_s$ and the target axial position values q as the second input target values $q_s$. In one embodiment the first input target values $x_s$ may also comprise, in addition or as an alternative, first and/or higher time derivatives of the target reference position values x. In addition or as an alternative, the second input target values $q_s$ may also comprise, in addition or as an alternative, first and/or higher time derivatives of the target axial position values q.

In addition, the drive control units 13A, 13B receive from the means 12 the corresponding components of the target axial position values q.

In one exemplary embodiment an acquisition means comprises by way of an example two resolvers each 21, 22 or 31, 32 per drive 23, 33.

The first resolver 21 determines the actual axial position values q21 for the actual axial position of the drive 23. The second resolver 22 determines in a redundant manner the actual axial position values q22 for the actual axial position of the drive 23. The third resolver 31 determines the actual axial position values q31 for the actual axial position of the drive 33. The fourth resolver 32 determines in a redundant manner the actual axial position values q32 for the actual axial position of the drive 33.

The first channel 100 receives the actual axial position values q21, q31; and the second channel 200 receives the redundantly determined actual axial position values q22, q32 as the second input actual values. In one embodiment these second input actual values may also comprise, in addition or as an alternative, first and/or higher time derivatives of the actual axial position values.

The drive control units 13A, 13B also receive one each of these actual axial position values q21 or q22 and/or q31 or q32 respectively and determine from them the lag errors A between the target axial position values and the actual axial position values. On the basis of these lag errors said drive control units control the drives 23, 33.

The first and second channels 100, 200 receive these lag errors A that have been determined by the drive control units 13A, 13B.

The means 11 receives one each of the actual axial position values q21, q31 and the lag error Δ.

On the basis of the forward transformation between the reference position values of the machine-fixed reference and the axial position values, the means 11 determines the first input actual value $x_i$. At the same time said means determines these input actual values $x_i$ on the basis of the lag error Δ by not forward transforming the determined actual axial position values q21, q31, but rather by first adding to them the corresponding component of the lag error Δ and then forward transforming this sum ($x_i$=T·{[q21, q31, . . . ]+Δ} with the forward transformation matrix T).

The first and second channels 100, 200 receive these respective first input actual values $x_i$. In one embodiment the first input actual values $x_i$ may also comprise, in addition or as an alternative, first and/or higher time derivatives of the actual reference position values x.

Thus, in step S10 the first and second channels 100, 200 receive the respective first input target values $x_s$;
second input target values $q_s$;
first input actual values $x_i$ and
second input actual values q21, q31 and/or q22, q32 as well as lag error Δ.

In a step S20 a means 111 of the first channel 100 compares the first reference target values, which depend on the first input target values, and the first reference actual values, which depend on the first input actual values, with each other. In the exemplary embodiment the first reference target values correspond to the first input target values $x_s$; and the first reference actual values correspond to the first input actual values $x_i$. In a modification the means 111 may determine, in addition or as an alternative, the first reference target values and the first reference actual values by means of a time differentiation, especially if the first input target values or the first input actual values, which are received from the means 11 of the machine control system 10, do not include any corresponding time derivatives.

In the event that a deviation between the first reference target values and the first reference actual values exceeds a specified tolerance (S20: "Y"), the means 111 of the first channel 100 of the fail-safe control system triggers a fault reaction, which is indicated by an interruption in the power supply, shown in bold type, of the drives 23, 33 in FIG. 1.

A means 211 of the second channel 200 compares in a redundant manner the first reference target values, which depend on the same first input target values in the same way as in the first channel, and the first reference actual values, which depend on the same first input actual values in the same way as in the first channel, with each other. As a result, in the exemplary embodiment these first reference target values of the second channel also correspond to the first input target values $x_s$; and these first reference actual values of the second channel correspond to the first input actual values $x_i$. Correspondingly, in one modification the means 211 may also determine, in addition or as an alternative, the first reference target values and the first reference actual values by means of a time differentiation, especially if the first input target values and/or the first input actual values, which are received from the means 11 of the machine control system 10, do not include any corresponding time derivatives.

In the event that a deviation between these first reference target values and first reference actual values of the second channel 200 exceeds the same specified tolerance (S20: "Y"), the means 211 of the second channel 200 of the fail-safe control system triggers the same fault reaction, which is indicated in an analogous manner by means an interruption in the power supply of the drives 23, 33 in FIG. 1.

In a step S30 a means 112 of the first channel 100 compares the second reference target values, which depend on the second input target values $q_s$; and the second reference actual values, which depend on the second input actual values q21, q31, with each other. In the exemplary embodiment the second reference target values correspond to the second input target values $q_s$, whereas the second reference actual values are determined, on the basis of the second input actual values q21, q31 and the lag error Δ by adding them together. In one modification the means 112 may determine, in addition or as an alternative, the second reference target values and the second reference actual values by means of a time differentiation, especially if the second input target values and/or the second input actual values, which are received from the means 12 of the machine control system 10, do not include any corresponding time derivatives.

In the event that a deviation between the second reference target values and the second reference actual values exceeds a specified tolerance (S30: "Y"), the means 112 of the first channel 100 of the fail-safe control system triggers the same fault reaction, which is indicated in an analogous manner by means of an interruption in the power supply in FIG. 1.

A means 212 of the second channel 200 compares in a redundant manner the second reference target values, which depend on the same second input target values $q_s$ in the same way as in the first channel, and the second reference actual values, which depend on the second input actual values q22, q32, which are determined in a redundant manner, in the same way as in the first channel, with each other. As a result, in the exemplary embodiment these second reference target values of the second channel also correspond to the second input target values $q_s$, whereas these second reference actual values of the second channel are determined on the basis of the second input actual values q22, q32 and the lag error Δ by adding them together. In one modification the means 212 may determine, in addition or as an alternative, the second reference target values and the second reference actual values by means of a time differentiation, especially if the second input target values and/or the second input actual values, which are received from the means 12 of the machine control system 10, do not include any corresponding time derivatives.

In the event that a deviation between these second reference target values and second reference actual values exceeds a specified tolerance (S30: "Y"), the means 212 of the second channel 200 of the fail-safe control system triggers the same fault reaction, which is indicated in an analogous manner by means an interruption in the power supply in FIG. 1.

In a step S40 the first and second channels 100, 200 compare in each case the reference target values and/or the reference actual values with, in particular, the variable, preset threshold values $X_0$ and trigger the same or a different fault reaction, in the event that a deviation between the reference values and the threshold values exceeds a specified tolerance (S40: "Y").

FIG. 1 shows as an example of the aforesaid that the means 111, 211 of the first and second channels 100, 200 are specified, for example, an allowable Cartesian working space $X_0$ and compare the reference actual values, which correspond to the actual reference position values $x_i$, received from the means 11, with said working space. As a result, when the TCP leaves this specified working space, said means trigger a fault reaction, for example move the robot into a safer pose (FIG. 2: "SAFE").

Even though exemplary embodiments are explained in the description above, it should be pointed out that a plurality of modifications are possible. Moreover, it should be pointed out that the exemplary embodiments are merely examples that do not restrict the scope of protection, the applications and configuration in any way. Instead, the description above gives the person skilled in the art a guideline for implementing at least one exemplary embodiment. At the same time it is possible to make diverse modifications, in particular, with respect to the function and the arrangement of the components described without departing from the scope of protection that will become apparent from the claims and the combination of features equivalent thereto.

LIST OF REFERENCE NUMERALS 10 machine control system
11, 12 means of the machine control system
13A, 13B drive control unit
21, 22 resolver
23 drive
31, 32 resolver
33 drive
100 first channel
111, 112 means of the first channel
200 second channel
211, 212 means of the second channel

What is claimed is:

1. A method for operating a multiple axis machine, wherein the machine includes a machine control system that controls drives of the machine, and a fail-safe control system that includes a first channel and a redundant, second channel which monitor the machine, the method comprising:
   in the first channel:
      receiving first input target values and first input actual values from the machine control system,
      comparing first reference target values, which depend on the first input target values, with first reference actual values, which depend on the first input actual values, with each other, and
      triggering a fault reaction when a deviation between the first reference target values and the first reference actual values exceeds a specified tolerance; and
   in the second channel:
      receiving first input target values and first input actual values from the machine control system,
      comparing first reference target values, which depend on the first input target values, with first reference actual values, which depend on the first input actual values, and
      triggering a fault reaction when a deviation between the first reference target values and the first reference actual values exceeds a specified tolerance;
   wherein the first input target values and the first input actual values comprise at least one of reference position values of a machine-fixed reference of the machine, or time derivatives of the reference position values; and
   wherein the machine control system determines at least one of these target reference position values or actual reference position values based on a transformation between reference position values of the machine-fixed reference and axial position values of the machine.

2. The method of claim 1, wherein the multiple axis machine is a robotic manipulator.

3. The method of claim 1, wherein the second channel of the fail-safe control system is dissimilar from the first channel.

4. The method of claim 1, further comprising:
in the first channel:
receiving second input target values and second input actual values, comparing second target values, which depend on the second input target values, with second reference actual values, which depend on the second input actual values, and
triggering a fault reaction when a deviation between the second reference target values and the second reference actual values exceeds a specified tolerance; and
in the second channel:
receiving second input target values and second input actual values, comparing second reference target values, which depend on the second input target values, with second reference actual values, which depend on the second input actual values, and
triggering a fault reaction when a deviation between the second reference target values and second reference actual values exceeds a specified tolerance;
wherein the second input target values and the second input actual values comprise at least one of the axial position values of the machine or time derivatives of the axial position values.

5. The method of claim 4, wherein the machine control system determines the target axial position values which the first and second channels receive from the machine control system, on the basis of a transformation between the reference position values of the machine-fixed reference and the axial position values of the machine.

6. The method of claim 1, wherein at least one of the input target values, the reference target values, or the reference actual values are determined on the basis of lag errors, wherein the lag errors are determined in the drive control units and/or by time differentiation.

7. The method of claim 1, wherein the first and second channels receive from the machine control system at least one of:
the same first input target values;
the same second input target values; or
the same first input actual values.

8. The method of claim 1, wherein the first and second channels receive redundantly determined second input actual values from an acquisition means.

9. The method of claim 1, wherein the first and second channels compare the respective reference target values and/or reference actual values with preset threshold values and trigger a fault reaction in the event that a deviation exceeds a specified tolerance.

10. The method of claim 9, wherein the preset threshold values are variable.

11. The method of claim 1, further comprising:
carrying out a self-test with the fail-safe control system; and
triggering a fault reaction in the event that the self-test indicates a malfunction.

12. The method of claim 11, wherein the self-test is carried out cyclically.

13. The method of claim 1, further comprising triggering a fault reaction in the event that the fail-safe control system receives an external error signal.

14. A system for operating a multiple axis machine, said system comprising:
a machine control system for controlling the drives of the machine;
a fail-safe control system configured for monitoring the machine and that comprises a first channel and a redundant, second channel;
a storage medium including program code that, when executed by the fail-safe control system, causes the fail-safe control system to:
in the first channel:
receive first input target values and first input actual values from the machine control system,
compare first reference target values, which depend on the first input target values, with first reference actual values, which depend on the first input actual values, with each other, and
trigger a fault reaction when a deviation between the first reference target values and the first reference actual values exceeds a specified tolerance; and
in the second channel:
receive first input target values and first input actual values from the machine control system,
compare first reference target values, which depend on the first input target values, with first reference actual values, which depend on the first input actual values, and
trigger a fault reaction when a deviation between the first reference target values and the first reference actual values exceeds a specified tolerance;
wherein the first input target values and the first input actual values comprise at least one of reference position values of a machine-fixed reference of the machine or, time derivatives of the reference position values; and
wherein the machine control system determines at least one of target reference position values or actual reference position values based on a transformation between the reference position values of the machine-fixed reference and axial position values of the machine.

15. The system of claim 14, wherein the multiple axis machine is a robotic manipulator.

16. The system of claim 14, wherein the second channel of the fail-safe control system is dissimilar from the first channel.

17. An arrangement comprising a robotic manipulator and the system of claim 14.

18. A computer program product for use with a multiple axis machine, wherein the machine includes a machine control system that controls drives of the machine, and a fail-safe control system that includes a first channel and a redundant, second channel which monitor the machine, the computer program product having programming code stored on a non-transitory machine readable data medium, the programming code configured to, when executed by the fail-safe control system, cause the fail-safe control system to:
in the first channel:
receive first input target values and first input actual values from the machine control system,
compare first reference target values, which depend on the first input target values, with first reference actual values, which depend on the first input actual values, with each other, and
trigger a fault reaction when a deviation between the first reference target values and the first reference actual values exceeds a specified tolerance; and
in the second channel:
receive first input target values and first input actual values from the machine control system, compare first reference target values, which depend on the first input target values, with first reference actual values, which depend on the first input actual values, and trigger a fault reaction when a deviation between the first reference target values and the first reference actual values exceeds a specified tolerance;

wherein the first input target values and the first input actual values comprise at least one of reference position values of a machine-fixed reference of the machine, or time derivatives of the reference position values; and wherein the machine control system determines at least one of target reference position values or actual reference position values on the basis of a transformation between the reference position values of the machine-fixed reference and axial position values of the machine.

\* \* \* \* \*